United States Patent
Reiter

(10) Patent No.: US 10,573,036 B1
(45) Date of Patent: Feb. 25, 2020

(54) CONCENTRIC DATA VISUALIZATION STRUCTURES

(71) Applicant: Target Brands, Inc., Minneapolis, MN (US)

(72) Inventor: Jennifer Elizabeth Reiter, Eden Prairie, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/237,222

(22) Filed: Dec. 31, 2018

(51) Int. Cl.
*G06T 11/20* (2006.01)
*G06F 16/904* (2019.01)

(52) U.S. Cl.
CPC .......... *G06T 11/206* (2013.01); *G06F 16/904* (2019.01)

(58) Field of Classification Search
CPC .................................................... G06T 11/206
See application file for complete search history.

(56) References Cited

U.S. PATENT DOCUMENTS

| | | | |
|---|---|---|---|
| 6,750,864 B1 | 6/2004 | Anwar | |
| 7,516,419 B2 | 4/2009 | Petro et al. | |
| 7,594,191 B2 | 9/2009 | Leidig et al. | |
| 7,992,102 B1 | 8/2011 | De Angelo | |
| 9,870,629 B2 | 1/2018 | Cardno et al. | |
| 2007/0005477 A1 | 1/2007 | McAtamney | |
| 2008/0307369 A1 | 12/2008 | Liu et al. | |
| 2010/0095235 A1* | 4/2010 | Bennett | G06Q 99/00 715/781 |
| 2012/0124520 A1 | 5/2012 | Samp et al. | |
| 2013/0044114 A1* | 2/2013 | Burtner | G06T 11/206 345/442 |
| 2013/0339890 A1* | 12/2013 | Wilkinson | G06F 3/0484 715/771 |
| 2014/0012693 A1* | 1/2014 | Sundaresan | G06Q 30/04 705/26.1 |
| 2014/0325417 A1* | 10/2014 | Hao | G06F 3/0484 715/771 |
| 2015/0356160 A1* | 12/2015 | Berwick | G06F 3/04842 715/781 |
| 2017/0046860 A1* | 2/2017 | Barosi | G06T 11/001 |

FOREIGN PATENT DOCUMENTS

WO 2008092149 A2 7/2008

\* cited by examiner

*Primary Examiner* — Phi Hoang
(74) *Attorney, Agent, or Firm* — Merchant & Gould P.C.

(57) ABSTRACT

A concentric data visualization structure for displaying a plurality of attributes specific to a dataset includes a percentage ring, a proportion ring and a count ring. The percentage ring indicates a percentage representative of an attribute of the dataset and comprises an arc having an arc length corresponding to the percentage. The proportion ring includes a plurality of wedges that make up a whole. Each wedge represents a percentage proportion of the whole and also represents an attribute of the dataset. The wedges, when displayed, fill the entirety of the proportion ring. The count ring indicates a count value representative of an attribute of the dataset. The count ring comprises a segmented circle where the number of the segments of the circle correspond to the count value.

20 Claims, 8 Drawing Sheets

| ATTRIBUTE |
|---|
| 1. Percent of guests with Retail Card spend |
| 2. Percent of guests who only spend during Holiday season |
| 3. Avg number of trips in last 365 days |
| 4. Avg number of trips in last 84 days |
| 5. Avg ratio of Retail Card spend to Total spend in last 365 days |
| 6. Avg total sales in last 365 days |
| 7. Avg sales for Store Grocery in last 365 days |
| 8. Avg sales for Store Ess Beauty in last 365 days |
| 9. Avg sales for Store Apparel/Accessories in last 365 days |
| 10. Avg sales for Store Hardlines in last 365 days |
| 11. Avg sales for Store Home in last 365 days |
| 12. Avg sales for Online Grocery in last 365 days |
| 13. Avg sales for Online Ess Beauty in last 365 days |
| 14. Avg sales for Online Apparel/Accessories in last 365 days |
| 15. Avg sales for Online Hardlines in last 365 days |
| 16. Avg sales for Online Home in last 365 days |
| 17. Avg trips for Store Grocery in last 365 days |
| 18. Avg trips for Store Ess Beauty in last 365 days |
| 19. Avg trips for Store Apparel/Accessories in last 365 days |
| 20. Avg trips for Store Hardlines in last 365 days |
| 21. Avg trips for Store Home in last 365 days |
| 22. Avg trips for Online Grocery in last 365 days |
| 23. Avg trips for Online Ess Beauty in last 365 days |
| 24. Avg trips for Online Apparel/Accessories in last 365 days |
| 25. Avg trips for Online Hardlines in last 365 days |
| 26. Avg trips for Online Home in last 365 days |

FIG. 3

CONCENTRIC DATA VISUALIZATION STRUCTURES

TECHNICAL FIELD

The present disclosure is directed to graphical displays of data and, more particularly, to the creation and rendering of concentric data visualization structures.

BACKGROUND

Data visualization is an important part of understanding and working with data. However, data visualization is difficult in the instance of large datasets with dozens or possibly even hundreds of dimensions. A single pie chart, bar graph or line chart, for example, are simply not sufficient to visualize and discover patterns, trends and correlations within a large dataset. Rather, there is a need for a data visualization structure that can incorporate a plurality of data dimensions in a single diagram.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to systems and methods for creating and rendering concentric data visualization structures. The concentric data visualization structures have the ability to represent virtually any number of features associated with small or large datasets. The data visualization structures are created and rendered in the form of a concentric ring diagram (however, concentric shapes other than a ring can be used), wherein a plurality of concentric rings are used to represent a plurality of data attributes associated with a dataset. In certain examples, the dataset represents spending transactions between a retail guest and a retailer. Further, in certain examples, the spending transactions are those occurring at one or more physical sites of the retailer and/or one or more e-retail websites of the retailer. The spending transactions are analyzed to determine one or more data attributes; the determined data attributes are typically expressed in the form of a numerical value. One of three ring-types is assigned to each data attribute according to the type of data attribute. The three ring-types include: a percentage ring, a proportion ring, and a count ring. Display features of the rings are defined to assist in distinguishing one ring from another. Such display features can include, but are not limited to, a concentric display order, a display color, a display pattern, and an inner and outer diameter of the ring (e.g., thickness). The determined data attributes, assigned rings and display features are used to generate instructions for constructing one or more of the concentric ring diagrams. The one or more concentric ring diagrams are then rendered as one or more visual images on one or more display devices according to the instructions providing a compact visualization of a plurality of data attributes. In certain embodiments, 26 data attributes are visualized in a single concentric ring diagram while in other embodiments the 26 data attributes are spread among a plurality of concentric ring diagrams. A number of data attributes greater or lesser than 26 data attributes in a single concentric ring diagram are also possible.

An aspect of the present disclosure is directed to a method for visualizing data of a dataset. The method includes receiving the dataset and determining a plurality of data attributes that represent the dataset. Each of the determined data attributes are represented by a percentage value, a proportion value of a whole value or a count value. The method further includes associating a ring-type with each determined attribute according to the value with which the determined data attribute is represented. A percentage ring-type is associated with the percentage value, a proportion ring-type is associated with the proportion value of the whole value, and a count ring-type is associated with the count value. The percentage ring-type indicates the percentage value with an exposed arc length that corresponds to the percentage value. The proportion ring-type indicates the proportion value of the whole value with a wedge-shape having a size corresponding to the proportion value. The count ring-type indicates the count value with a segmented ring; the number of segments in the ring corresponding to the count value. The method further includes generating instructions for rendering a concentric visualization data structure that includes a least one percentage ring-type, at least one proportion ring-type and at least one count ring-type. The method also includes rendering the concentric visualization data structure as an image of at least first, second and third concentric rings which correspond to the percentage ring-type, the proportion ring-type and the count ring-type, respectively.

Another aspect of the present disclosure is directed to a concentric data visualization structure for displaying a plurality of attributes specific to a dataset. The concentric data visualization structure includes a percentage ring, a proportion ring and a count ring. The percentage ring indicates a percentage representative of an attribute of the dataset and comprises an arc having an arc length corresponding to the percentage. The proportion ring includes a plurality of wedges that make up a whole. Each wedge represents a percentage proportion of the whole and also represents an attribute of the dataset. The wedges, when displayed, fill the entirety of the proportion ring. The count ring indicates a count value representative of an attribute of the dataset. The count ring comprises a segmented circle where the number of the segments of the circle correspond to the count value.

Still another aspect of the present disclosure is directed to a system for visualizing data of a dataset. The system includes a display device, a memory device storing executable instructions and a processing device in communication with the display device and the memory device. The processing device executes the instructions on the memory device and is caused to receive a dataset and determine a plurality of data attributes that represent the dataset. Each of the determined data attributes are represented by a percentage value, a proportion value of a whole value or a count value. The processing device is further caused to associate a display-type with each determined attribute according to the value with which the determined data attribute is represented. For an example, a percentage display-type is associated with the percentage value, a proportion display-type is associated with the proportion value of the whole value and a count display-type is associated with the count value. The percentage display-type indicates the percentage value with an exposed length of a first shape corresponding to the percentage value. The proportion display-type indicates the proportion value of the whole value as a wedge-shape having a size corresponding to the proportion value. The count display-type indicates the count value with a segmented second shape, the number of segments in the segmented second shape correspond to the count value. The processing device is further caused to generate instructions for rendering a concentric visualization data structure that includes a least one percentage display-type, at least one proportion display-type and at least one count display-type. In response to the instructions, the processing device is caused to render, on the display, the concentric visualization data structure as an image of at least first, second and third concentric shapes which correspond to the percentage display-type, the proportion display-type and the count display-type, respectively.

BRIEF DESCRIPTION OF THE DRAWINGS

Non-limiting and non-exhaustive examples are described with reference to the following Figures.

FIG. 3 is an example of data attributes to be calculated based on transactional data.

FIG. 4A-1 and FIG. 4A-2 illustrate examples a of a percentage ring.

DETAILED DESCRIPTION

Various embodiments will be described in detail with reference to the drawings that form a part hereof and, in which are shown by way of illustrations, specific embodiments or examples. Embodiments can be practiced as methods, systems or device. Accordingly, embodiments may take the form of a hardware implementation, a software implementation, or an implementation combining both hardware and software. The following detailed description is therefore not to be taken in a limiting sense, and the scope of the present disclosure is defined by the appended claims and their equivalents.

As noted in the Summary, the present disclosure is directed to systems and methods for creating and rendering concentric data visualization structures. The concentric data visualization structures have the ability to represent virtually any number of features associated with small or large datasets. The data visualization structures are created and rendered in the form of a concentric ring diagram (however, shapes other than a ring can be used), wherein a plurality of concentric rings is used to represent a plurality of data attributes associated with a dataset. In certain examples, the dataset represents spending transactions between a retail guest and a retailer. Further, in certain examples, the spending transactions are those occurring at one or more physical sites of the retailer and/or one or more e-retail websites of the retailer. The spending transactions are analyzed to determine one or more data attributes; the determined data attributes are typically expressed in the form of a numerical value. One of three ring-types is assigned to each data attribute according to the type of data attribute. The three ring-types include: a percentage ring, a proportion ring, and a count ring. Display features of the rings are defined to assist in distinguishing one ring from another. Such display features can include, but are not limited to, a concentric display order, a display color, a display pattern, and an inner and outer diameter of the ring (e.g., thickness). The determined data attributes, assigned rings and display features are used to generate instructions for constructing one or more of the concentric ring diagrams. The one or more concentric ring diagrams are then rendered as one or more visual images on one or more display devices according to the instructions providing a compact visualization of a plurality of data attributes. In certain embodiments, 26 data attributes are visualized in a single concentric ring diagram while in other embodiments the 26 data attributes are spread among a plurality of concentric ring diagrams. A number of data attributes greater or lesser than 26 data attributes in a single concentric ring diagram are also possible.

Figure 1:
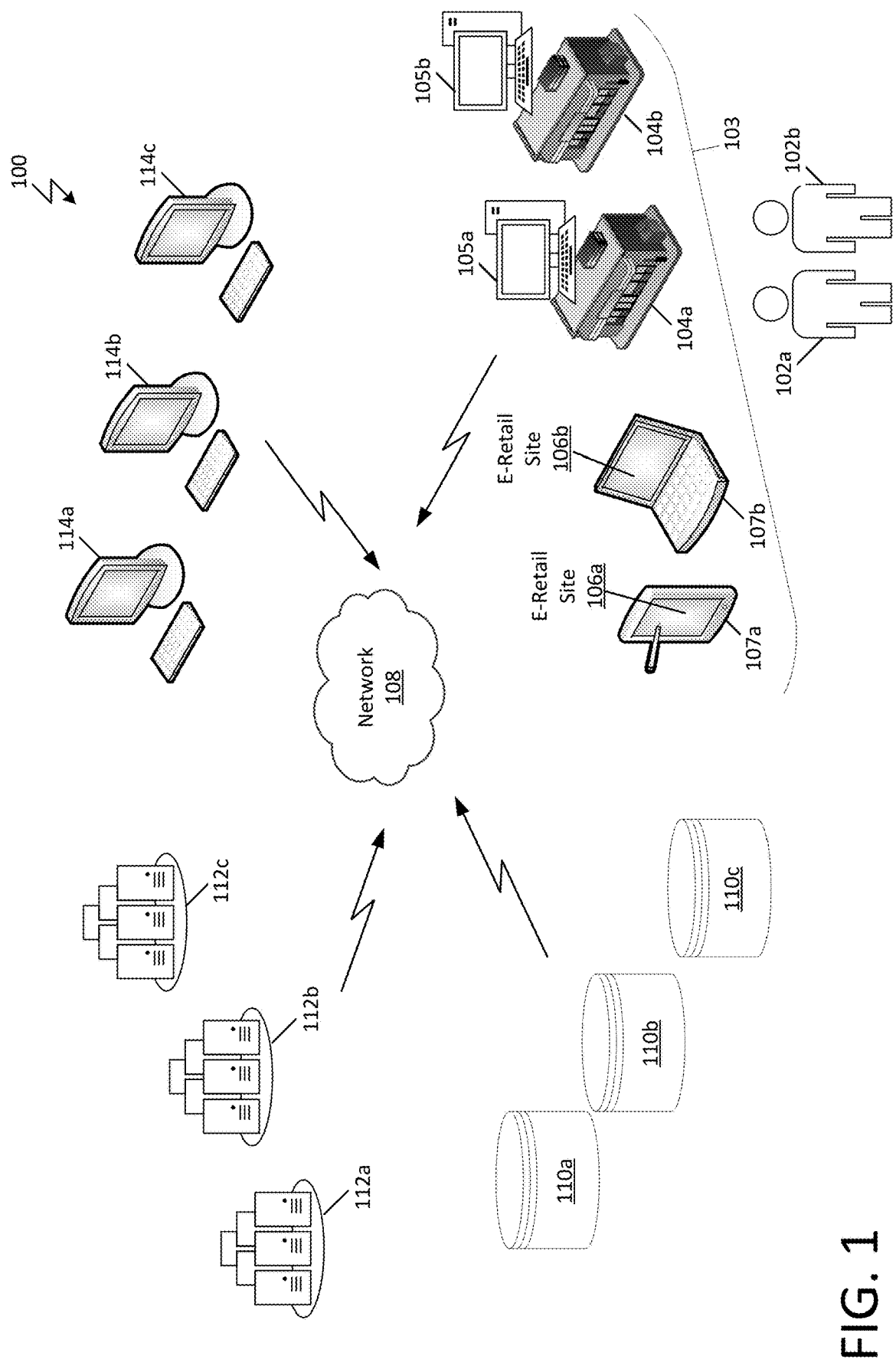
FIG. 1 is an example configuration of an environment that is used for creating and rendering concentric data visualization structures.

Referring to FIG. 1, an example configuration of an environment 100 for creating and rendering concentric data visualization structures is illustrated. The environment 100 preferably includes one or more data generators to establish a dataset which can be utilized in the creation and rendering of concentric data visualization structures according to the present in disclosure. In the example of FIG. 1, the data generators comprise retail guests 102, e.g. guests 102a and 102b, and a retailer 103 with the generated data being representative of the spending transactions between the retail guests 102 and the retailer 103. In the example of FIG. 1, the retailer 103 is represented by both physical retail sites 104 and e-retail websites 106. Each physical retail site 104, e.g., physical retail site 104a and 104b, utilizes one or more retail computing devices 105, e.g., retail computing device 105a, 105b, for generating, tracking, transmitting and/or receiving data related to guest/retailer spending transactions. Each e-retail website 106, e.g. e-retail website 106a and 106b, is accessed via one or more e-retail computing devices 107, e.g. e-retail computing device 107a and 107b, which can be used for generating, transmitting and/or receiving data related to guest/retailer spending transactions.

It should be noted that, while the present disclosure utilizes an example of transactional data in the creation of concentric data visualization structures, the data may comprise any type of numerical data that can be analyzed to a proportion, a percentage or a count.

The data generated from the spending transactions between guests 102 and the retailer 103 are transmitted through a network 108 and stored in one or more databases 110 (e.g., database 110a, database 110b, database 110c). The data stored by the one or more databases 110 is accessible via network 108 (or direct access) by one or more server computing devices 112 (e.g., server computing devices 112a, server computing devices 112b, server computing devices 112c). The one or more server computing devices 112 operate on the data to determine data attributes of the data as well as to create and render one or more concentric data visualization structures, which are displayed on one or more data visualization computing devices 114 (e.g., data visualization computing device 114a, data visualization computing device 114b, data visualization computing device 1104c). Note the environment 100 is but one possible configuration of an environment for creating and rendering concentric data visualization structures and, as known by those skilled in the art, can be condensed or expanded to include a fewer or greater number of elements than that depicted. For example, all functions for tracking data, analyzing data, creating and rendering one or more concentric data visualization structures, and displaying the concentric data visualization structures could be performed on a single computing device.

In a basic configuration, the one or more e-retail computing devices 107 are personal or handheld computers having both input elements and output elements operated by the one or more guests 102. For example, the one or more e-retail computing devices 107 may include one or more of: a mobile telephone; a smart phone; a tablet; a phablet; a smart watch; a wearable computer; a personal computer; a desktop computer; a laptop computer; a gaming device/computer (e.g., Xbox); a television; and the like. This list is only and should not be considered as limiting. Any suitable e-retail computing device 107 for generating and/or tracking spending transactions between guests 102 and the retailer 103 can be used. Similarly the one or more retail computing devices 105 are computing devices having both input and output elements operated by one or more retail employees that are capable of generating and/or tracking transactional spending data relating to in-store retail spending transactions occurring at the physical retail site 104.

The transactional spending data between guests 102 and the retailer 103 generally includes how much is spent by a guest 102 at the one or more physical retail sites or on the one or more e-retail websites 106 as well as how many trips the guest 102 has made to the physical retail site 104 or the e-retail website 106. More specific examples of transactional spending data are detailed herein.

In certain embodiments, the network 108 is a computer network such as an enterprise intranet and/or the Internet. In this regard, the network 108 may include a Local Area Network (LAN), a Wide Area Network (WAN), the Internet, wireless and wired transmission mediums. In certain embodiments, server computing devices 112 may communicate with some components of the environment via a local network (e.g., an enterprise intranet), whereas another server computing device 112 may communicate with other components of the environment via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

In a basic configuration, server computing devices 112 may include at least a processing unit and a system memory for executing computer-readable instructions. In some aspects, server computing devices 112 may comprise one or more server computing devices 112 in a distributed environment (e.g., cloud-based computing environment). Server computing devices 112 may provide data regarding transactions to and from e-retail computing devices 107 and/or data visualization computing devices 114.

In a basic configuration, the data visualization computing devices 114 are generally laptop or desktop computing devices capable of displaying concentric data visualization structures. However, the data visualization computing devices 114 may be any type of computing device capable of displaying the concentric data visualization structures (e.g., a mobile telephone; a smart phone; a tablet; a phablet; a smart watch; a wearable computer; a personal computer; a gaming device/computer (e.g., Xbox); a television; and the like. In certain configurations, the data visualization computing devices 114 are replaced with monitors for viewing the concentric data visualization structures.

Figure 2:
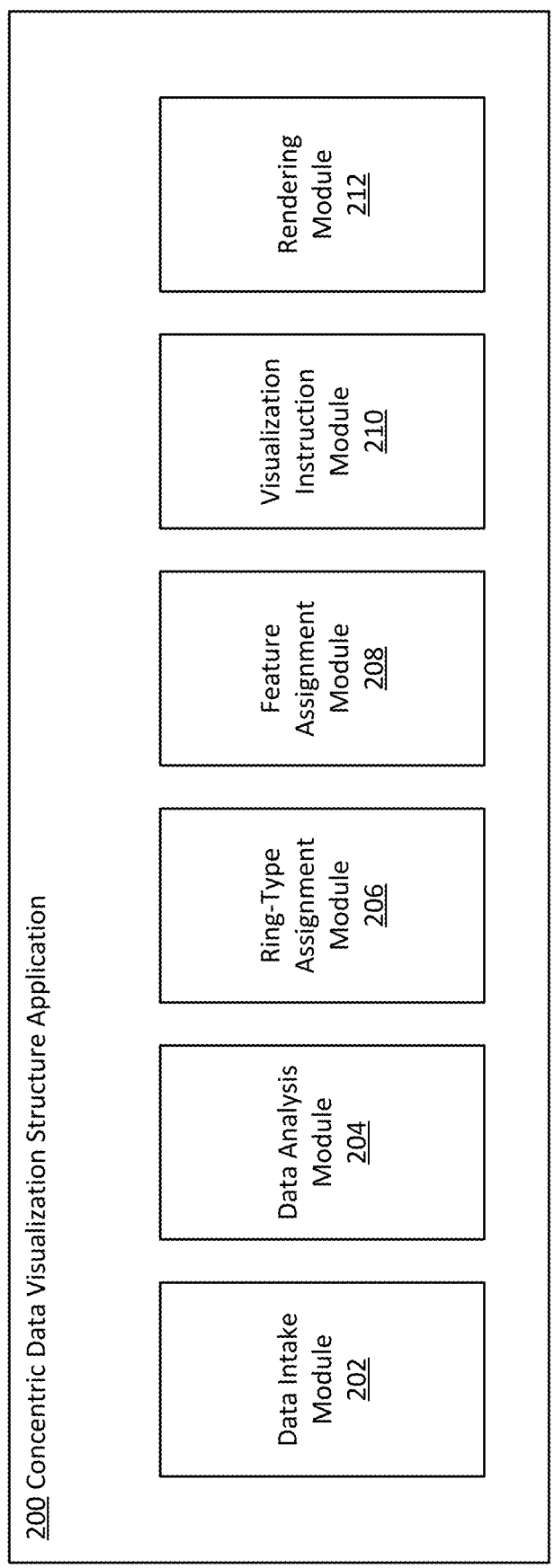
FIG. 2 is an example configuration of an application for creating and rendering concentric data visualization structures.

In certain embodiments, the server computing devices 112 execute instructions of a concentric data visualization structure application. Referring to FIG. 2, an example configuration of a concentric data visualization structure application 200 is illustrated. As shown the concentric data visualization structure application includes a data intake module 202, a data analysis module 204, a ring-type assignment module 206, a feature assignment module 208, a visualization instruction module 210, and a rendering module 212.

The data intake module 202 receives transactional data (e.g., the transactional data stored on server computing devices 112) for a specific cluster or grouping of guests 102 that have purchased items from one or more physical retail sites 104 and/or from one or more e-retail websites 106 of the retailer 103. By way of example, a physical retail site of the retailer TARGET® may comprise a TARGET® store while an e-retail website of the retailer TARGET® may comprise TARGET.com. As indicated, the transactional data can be associated with a specific cluster of guests 102 according to a cluster definition. For example, a cluster definition may include guests 102 that have a specific zip code or area code, guests 102 that spend at a specific physical retail site, guests 102 that spend over or under a certain amount, guests 102 that are known to have an income above or below an amount, or guests 102 that some other common identifiable characteristic. In certain example embodiments, the transactional data can be associated with one or more specific physical retail sites 104 and/or one or more specific e-retail websites 106 of the retailer 103 according to retailer definition. For example, a retailer definition may include only physical retail sites 104 (worldwide, national, by state, by city, etc.) or may include only e-retail websites (worldwide, by country, etc.) or a combination of specific physical retail sites 104 and specific e-retail websites 106.

The transactional data of the data intake module 202 is provided to the data analysis module 204. The data analysis module 204 analyzes the transactional data to provide analysis results according to a plurality of data attributes having pre-defined data attribute definitions for the determination of a representative numerical value. In certain example embodiments, the plurality of data attributes comprises exactly 26 data attributes. However, a greater or lesser number of data attributes can be utilized as desired or as suitable to a specific dataset. An abbreviated listing of the 26 data attributes is provided in the Table of FIG. 3 while a more detailed listing of the 26 data attributes is provided below and includes:

1. A determination of a percentage of guests with retail card spending (e.g. a retail credit or debit card associated with a retailer and/or e-retailer) at a specific one or more physical retail sites and/or one or more associated e-retail websites.

2. A determination of a percentage of guests with spending only during a pre-defined holiday season (e.g. from Thanksgiving in November to the New Year) at the specific one or more physical retail sites and/or one or more associated e-retail websites.

3. A determination of the average number of trips by spending guests to the specific one or more physical retail sites and/or one or more associated e-retail websites in the last year.

4. A determination of the average number of trips by spending guests to the specific one or more physical retail sites and/or one or more associated e-retail websites in a last predefined number of days (e.g. the last 84 days).

5. A determination of the average ratio of retail card spending to total spending for the guests at the specific one or more physical retail sites and/or one or more associated e-retail websites in the last year.

6. A determination of the average total sales in the last year by the guests at the specific one or more physical retail sites and/or one or more associated e-retail websites.

7. A determination of the average sales of grocery products at the specific one or more physical retail sites by guests in the last year.

8. A determination of the average sales of essential beauty products at the specific one or more physical retail sites by guests in the last year.

9. A determination of the average sales of apparel/accessory products at the specific one or more physical retail sites by guests in the last year.

10. A determination of the average sales of hardline products at the specific one or more physical retail sites by guests in the last year.

11. A determination of the average sales of home products at the specific one or more physical retail sites by guests in the last year.

12. A determination of the average sales of grocery products via the e-retailer website by guests in the last year.

13. A determination of the average sales of essential beauty products via the e-retailer website by guests in the last year.

14. A determination of the average sales of apparel/accessory products via the e-retailer website by guests in the last year.

15. A determination of the average sales of hardline products via the e-retailer website by guests in the last year.

16. A determination of the average sales of home products via the e-retailer website by guests in the last year.

17. A determination of the average number of trips by the spending guests to the specific one or more physical retail sites for the purchase of grocery products in the last year.

18. A determination of the average number of trips by the spending guests to the specific one or more physical retail sites for the purchase of essential beauty products in the last year.

19. A determination of the average number of trips by the spending guests to the specific one or more physical retail sites for the purchase of apparel/accessory products in the last year.

20. A determination of the average number of trips by the spending guests to the specific one or more physical retail sites for the purchase of hardline products in the last year.

21. A determination of the average number of trips by the spending guests to the specific one or more physical retail sites for the purchase of home products in the last year.

22. A determination of the average number of trips by the spending guests via the e-retailer website for the purchase of grocery products in the last year.

23. A determination of the average number of trips by the spending guests via the e-retailer website for the purchase of essential beauty products in the last year.

24. A determination of the average number of trips by the spending guests via the e-retailer website for the purchase of apparel/accessory products in the last year.

25. A determination of the average number of trips by the spending guests via the e-retailer website for the purchase of hardline products in the last year.

26. A determination of the average number of trips by the spending guests via the e-retailer website for the purchase of home products in the last year.

As indicated herein, the data analysis module 204 provides a result for each data attribute that is in the form of a numerical value based on a numerical calculation/determination. The numerical value is representative of the corresponding data attribute within the transactional data provided for analysis.

The data attributes determined by the data analysis module 204 are provided to the ring-type assignment module 206. The ring-type assignment module 206 assigns one of three types of rings to each data attribute. The three types of rings include a percentage ring, a proportion ring and a count ring.

Figure 4C:
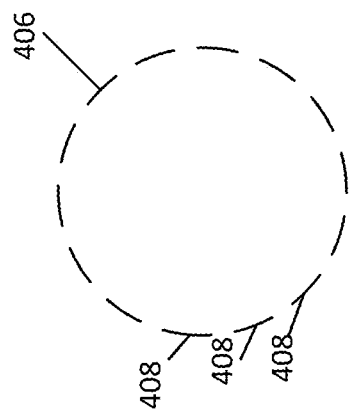
FIGS. 4B-4C illustrate examples of a proportion ring and a count ring, respectively.
Figure 4B:
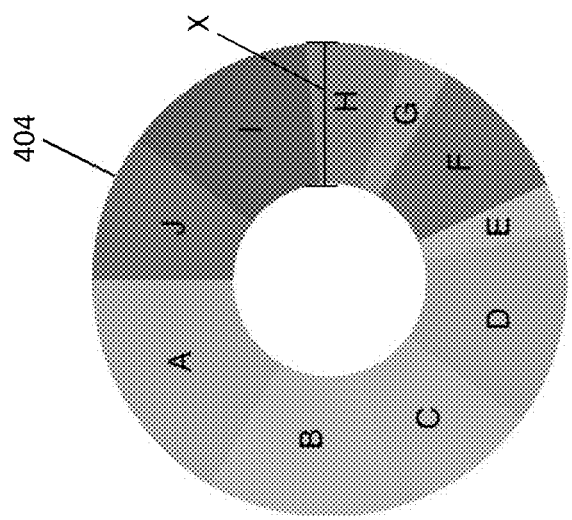
Figures 1, 2, 4A:
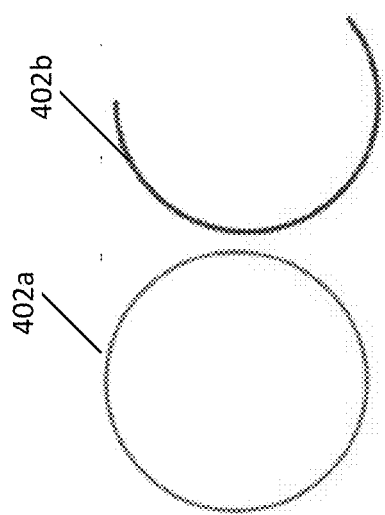

The percentage ring visually represents a percentage and is indicated by an arc length. Referring to FIG. 4A-1, a first example of a percentage ring 402a is illustrated. Percentage ring 402a represents a percentage of 100% and is illustrated by a complete circle. Referring to FIG. 4A-2, a second example of a percentage ring 402b is illustrated. Percentage ring 402b represents a percentage of approximately 60% since the arc length is approximately 60% of a total circle. In the example of the 26 data attributes, the percentage ring is used to represent data attributes 1, 2 and 5.

The proportion ring visually represents percentages of a whole and is analogous to a pie chart. FIG. 4B illustrates an example of a proportion ring 404. Proportion ring 404 is divided into ten wedges, e.g. wedges A-J, with the size of the wedge representative of the percentage of the whole. For example, wedge A represents approximately 23% of the whole, wedge B represents approximately 20% of the whole, wedge C represents approximately 12% of the whole, etc. Each wedge represents one data attribute and, as such, with a proportion ring, a plurality of data attributes is combined into a single ring. It is possible for one or more of the wedges to have a value of 0% thereby eliminating the wedge from the proportion ring. A thickness X of the proportion ring can provide additional information about another attribute.

In the example of the 26 data attributes, a first proportion ring is used to represent data attributes 7-16, with each data attribute comprising a corresponding wedge representing a percentage of the whole of average sales for all products at the specific one or more physical retail sites and/or the e-retailer website by guests in the last year. A thickness of the first proportion ring is proportional to attribute six (e.g. avg. total sales in last 365 days). A second proportion ring is used to represent data attributes 17-26, with each data attribute comprising a corresponding wedge representing a percentage of the whole of average number of trips by the spending guests to the specific one or more physical retail sites and/or the e-retailer website for the purchase of all products in the last year. A thickness of the second proportion ring is proportional to attribute three (e.g. avg. number of trips in last 365 days).

The count ring visually represents a count via the number of segments in which the ring is divided. FIG. 4C illustrates an example of a count ring wherein count ring 406 represents a count of 14 as the count ring 406 include 14 segments 408. In the example of the 26 data attributes, a count ring can be used to represent data attributes 3 and 4.

The determinations of the data attributes made by the data analysis module 204 and the identification of the ring-type assigned by the ring-type assignment module 206 are provided to the feature assignment module 208. The feature assignment module assigns features such as a thickness (e.g. inner radius and outer radius) for each of the rings as well as a color, pattern and/or any other characteristic that might be desirable to differentiate one ring from another in display of a concentric data visualization structure. In the instance of the proportion ring, each of the wedges is assigned a unique color or display pattern to differentiate from the other wedges within the ring.

In certain example embodiments, the features of the rings are assigned to accommodate the display of all 26 data attributes in a single diagram of concentric circles using one or more of percentage rings, one or more of proportion rings and one or more of count rings. In certain example embodiments, and for ease of reading, percentage rings are provided as the outermost rings, segment rings are provided as the next outer most rings and proportion rings comprise the innermost rings. However, a plurality of rings can be displayed in any desired order. In certain embodiments, less than all data attributes are represented in a single diagram of a concentric data visualization structure. In certain embodiments, all three ring-types are represented in single diagram while in other embodiments less than all three ring-types are represented in a single diagram. In certain example embodiments, five or more data attributes are represented in a single diagram. In certain example embodiments, ten or more data attributes are represented in a single diagram. In certain example embodiments, 15 or more data attributes are represented in a single diagram. In certain example embodiments, 20 or more data attributes are represented in a single diagram. In certain example embodiments, 26 or more data attributes are represented in a single diagram.

Figure 5:
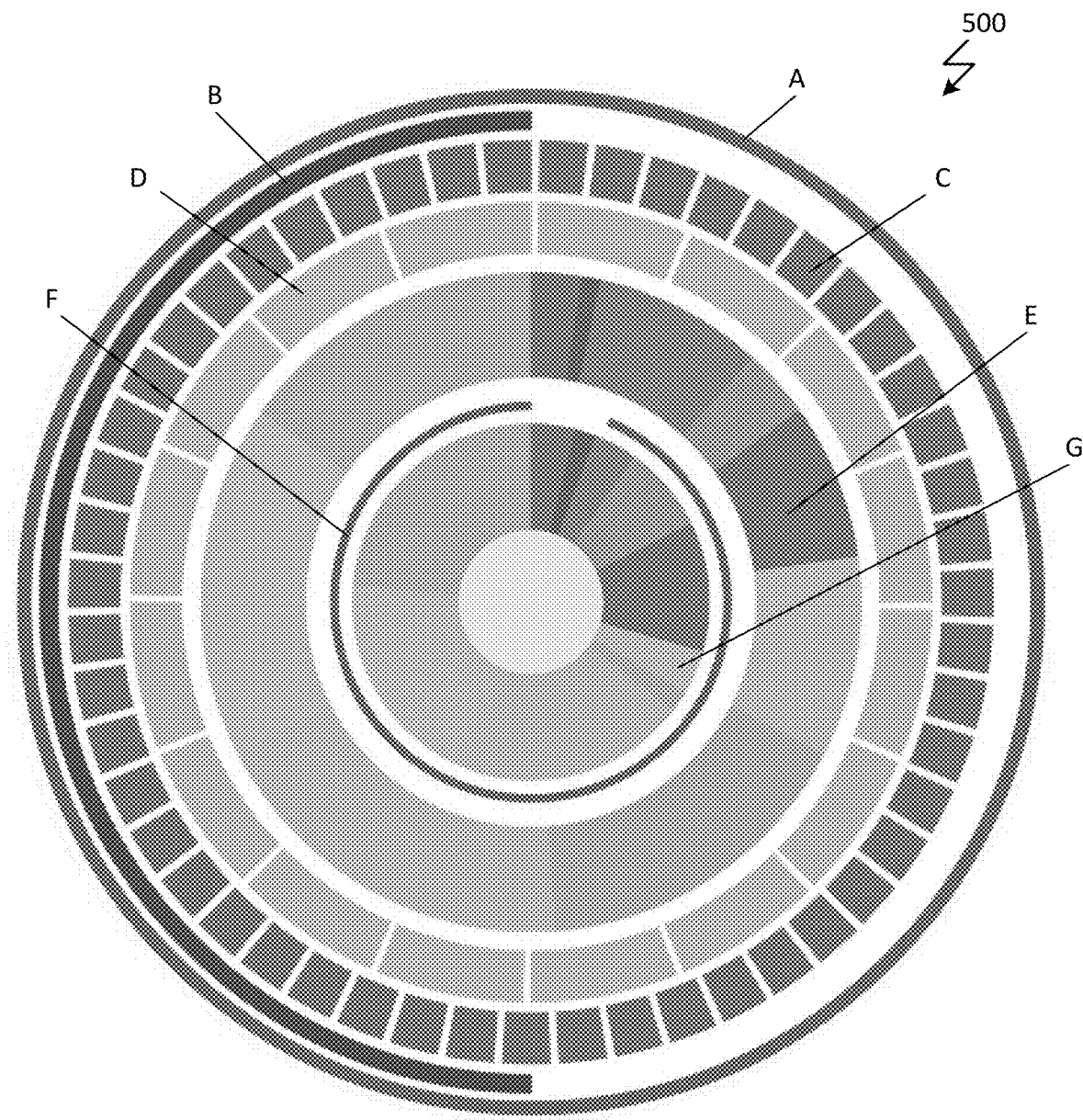
FIG. 5 is an example of a single concentric data visualization structure representing 26 data attributes.

FIG. 5 illustrates an example of diagram 500 containing rings representing all 26 data attributes. The diagram 500 includes percentage ring A representing data attribute one and percentage ring B representing data attribute two. Further, the diagram 500 includes count ring C representing data attribute three and count ring D representing data attribute four. Attributes 7-16 are represented on the diagram 500 by proportion ring E. Attribute five is represented on the diagram 500 as percentage ring F. Finally, the diagram 500 includes proportion ring G representing data attributes 17-26. Proportion rings E and G provide further data insight based on their thickness. For example, the thickness of proportion ring E is proportional to attribute six (e.g. avg. total sales in last 365 days) and the thickness of proportion ring G is proportional to attribute three (e.g., avg. number of trips in last 365 days).

In certain example embodiments, the feature assignment module 208 can additionally be utilized to define features in the form of the content to be provided in a displayed explanation of each ring. For example, the content may include a name, definition and/or example calculation/determination for one or more data attributes, a name, definition and/or example calculation for one or more of the rings, the content may include a name, definition and/or example calculation/determination for each wedge of a proportional ring, etc. Other desirable and/or appropriate content can also be included. The content can be displayed, for example, in legend proximate the diagram or in hover notes displayed as a user moves a cursor over a ring and/or wedge of the diagram. Other content displays are also possible.

Data regarding assigned ring-types and features of the rings in relation to the data attributes which are to be represented in a diagram of a concentric data visualization structure are provided to the visualization instruction module 210. The visualization instruction module 210 generates the instructions needed create a visual representation of the rings of a diagram based on the provided information (e.g., attribute, ring-type, features). In certain example embodiments, the visualization instruction module 210 comprises an application entitled Bokeh. Bokeh is an interactive visualization library for Python that enables meaningful presentation of very large or streaming datasets in modern web browsers. In certain example embodiments, the "annular wedge" function of Bokeh is used to generate the rings of the diagram. Other applications for the visualization of complex and/or large sets data may also, or alternatively, be used to generate the concentric rings of the diagram. Such other applications can include, but are not limited to, D3.js, RAWGraphs, Tableau, Matplotlib, Plotly, NVD3, Google Charts, and Desmos.

The instructions generated by the visualization instruction module 210 to produce the visual image of the concentric data visualization structure are provided to the rendering module 212. The rendering module 212 renders the concentric data visualization structure as an image on a display device according to the instructions provided by the visualization instruction module 210. In certain example embodiments, the rendering module comprises a rendering instruction in the Bokeh application described above. In certain example embodiments, the rendering module is an element of a drawing application or tool while in other embodiments the rendering module is a stand-alone application specifically dedicated to rendering of images. In certain example embodiments, the rendering occurs in a business tool application (or the rendered image is provided to the business tool application) that is used to determine patterns, trends, correlations, etc. in a business related data.

Figure 6:
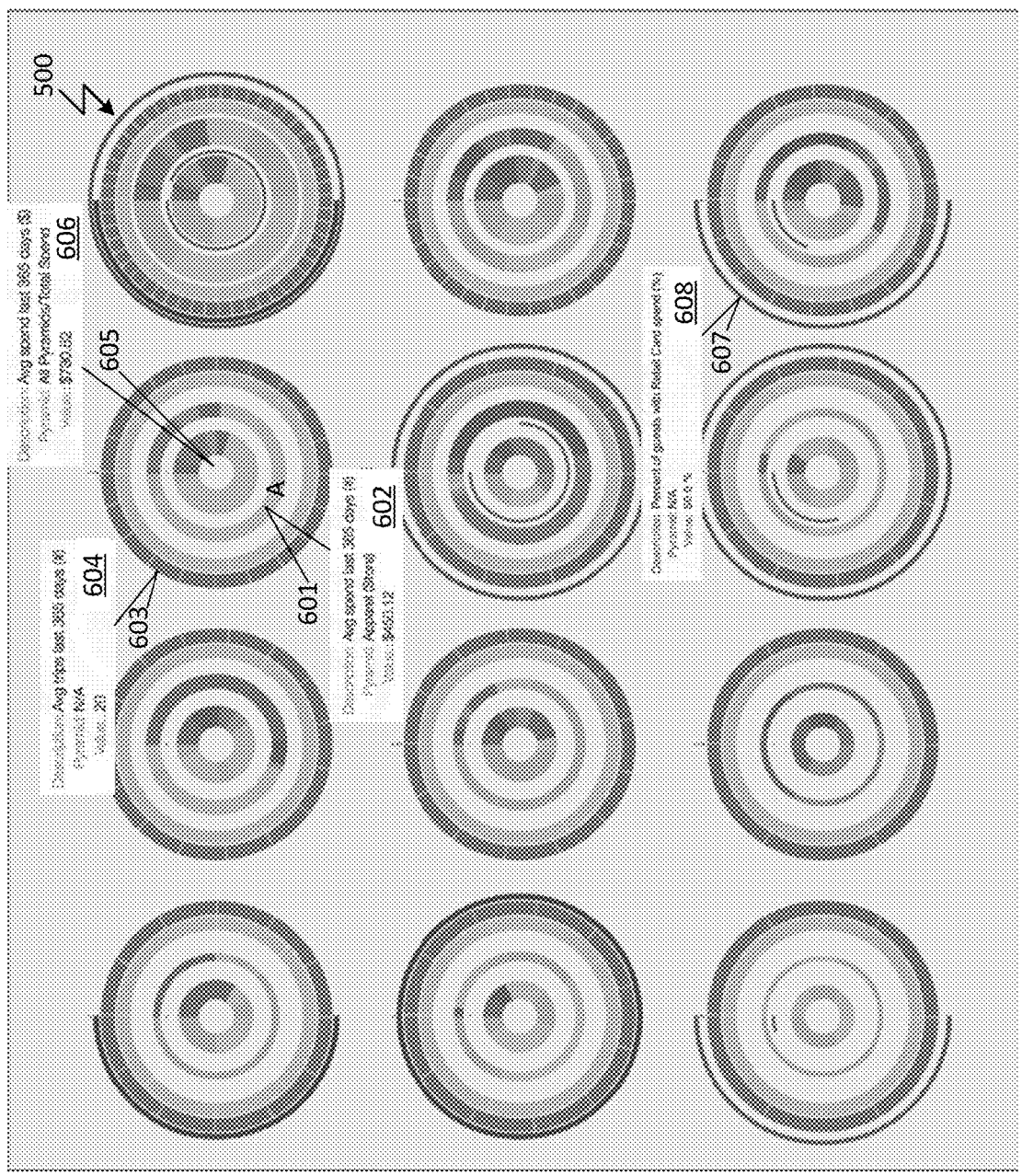
FIG. 6 is an example of a plurality of different concentric data visualization structures for a single dataset.

FIG. 6 illustrates one example of a plurality of ring diagrams rendered by the rendering module 212. Each of the ring diagrams represents all 26 data attributes (note that certain attributes may be at a zero or near zero value and are therefore not provided on the ring diagram) as well as the ring types assigned to the data attributes and the features assigned to the rings. Note that the right-most, upper-most diagram corresponds to the diagram 500 of FIG. 5. Each of the ring diagrams of FIG. 6 are presented in the same ring order as FIG. 5. However, as noted earlier, any desired ring order can be used. Examples of various hover notes displayed as a user moves a cursor over a ring and/or a wedge of the diagram are also illustrated in FIG. 6. Each hover note provides a text description of the relevant attribute of the ring over which the cursor is moving or resting, and also provides a numerical value of the relevant attribute. For example, hover note 602 is an example of the text description and numerical value that is displayed when moving a cursor over wedge A of proportion ring 601. Hover note 604 is an example of the text description and numerical value that is displayed when moving a cursor over the count ring 603. Hover note 606 is an example of the text description and numerical value that is displayed when moving a cursor over a middle 605 of a diagram, notably the value of the average total sales in the last 365 days (e.g., attribute six) is presented. Hover note 608 is an example of the text description and numerical value that is displayed when moving a cursor over the percentage ring 607.

Figure 7:
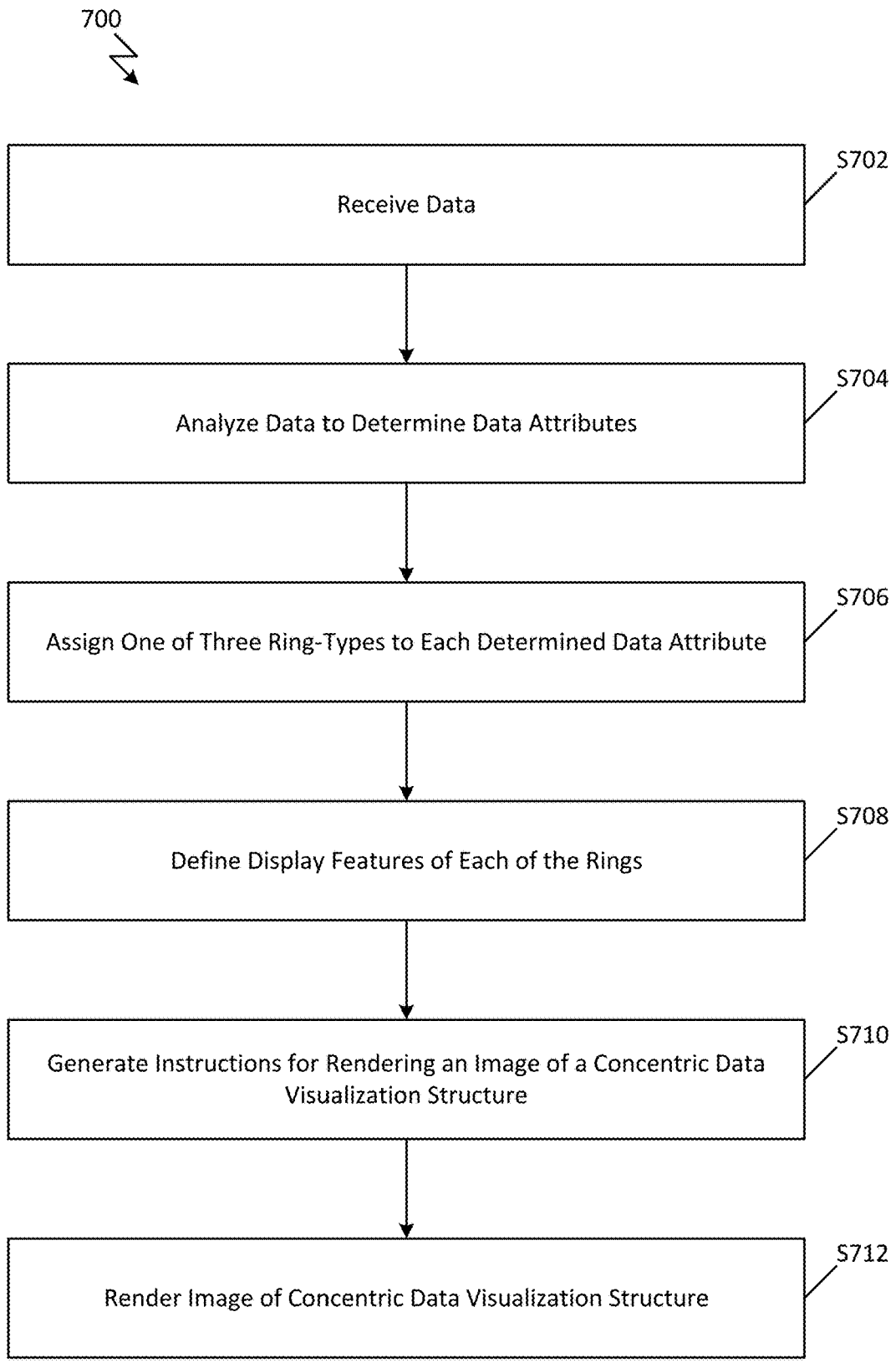
FIG. 7 is a flowchart illustrating a method for creating and rendering concentric data visualization structures.

FIG. 7 is a flowchart illustrating a method 700 for creating and rendering a concentric data visualization structures. As shown, the method 700 begins with receiving data (S702) regarding a specific cluster of guests and their transactions (e.g. spending transactions) with a retailer at one or more physical sites of the retailer and/or one or more e-retail websites of the retailer. The transaction data is then analyzed (S704) to determine various data attributes that exist within the data. The data attributes determined under analysis are generally pre-defined data attributes that provide insight into the transaction data. In certain example embodiments, the pre-defined data attributes comprise the 26 data attributes described here and illustrated in the table of FIG. 3. A greater or fewer number of data attributes may be used as appropriate to the dataset or as desired.

Each of the determined data attributes, which typically comprise numerical values (however, representation of a data attribute in a form other than a numerical value is also possible), is then assigned one of three ring-types (S706), e.g., a percentage ring, a proportion ring or count ring, that is suited to the specific determined data attribute. The features of each of the assigned rings are then defined (S708) with various display features, e.g. thickness of the ring, color or pattern of the ring, color or pattern of wedges within the ring, concentric display order of the rings, etc. The values of the determined data attributes, the assigned rings and their defined features are then used to generate one or more instructions for rendering an image (e.g. a diagram of a concentric data visualization structure), representing the data attributes, rings and features (S710). In certain example embodiments all determine data attributes are included in the ring diagram while in other example embodiments fewer than all determined attributes are included in the ring diagram. In certain example embodiments, the number of determined data attributes to be used in a ring diagram are manually selected by a user while in other example embodiments one or more pre-defined selection formulas are used in automatically selecting the defined data attributes to be used in one or more specific ring diagrams. The one or more ring diagram images specified by the instructions for constructing the image (or images) are then rendered to produce one or more visual images on one or more display devices (S712).

The method described above includes steps occurring in a specific sequence. However, it should be noted that the steps of the method can be performed in any suitable sequence and can include a greater or lesser number of steps than those provided in FIG. 7. Further, the recited steps can additionally, or alternatively, be combined or divided to reduce or increase the number of steps, respectively.

Figure 8:
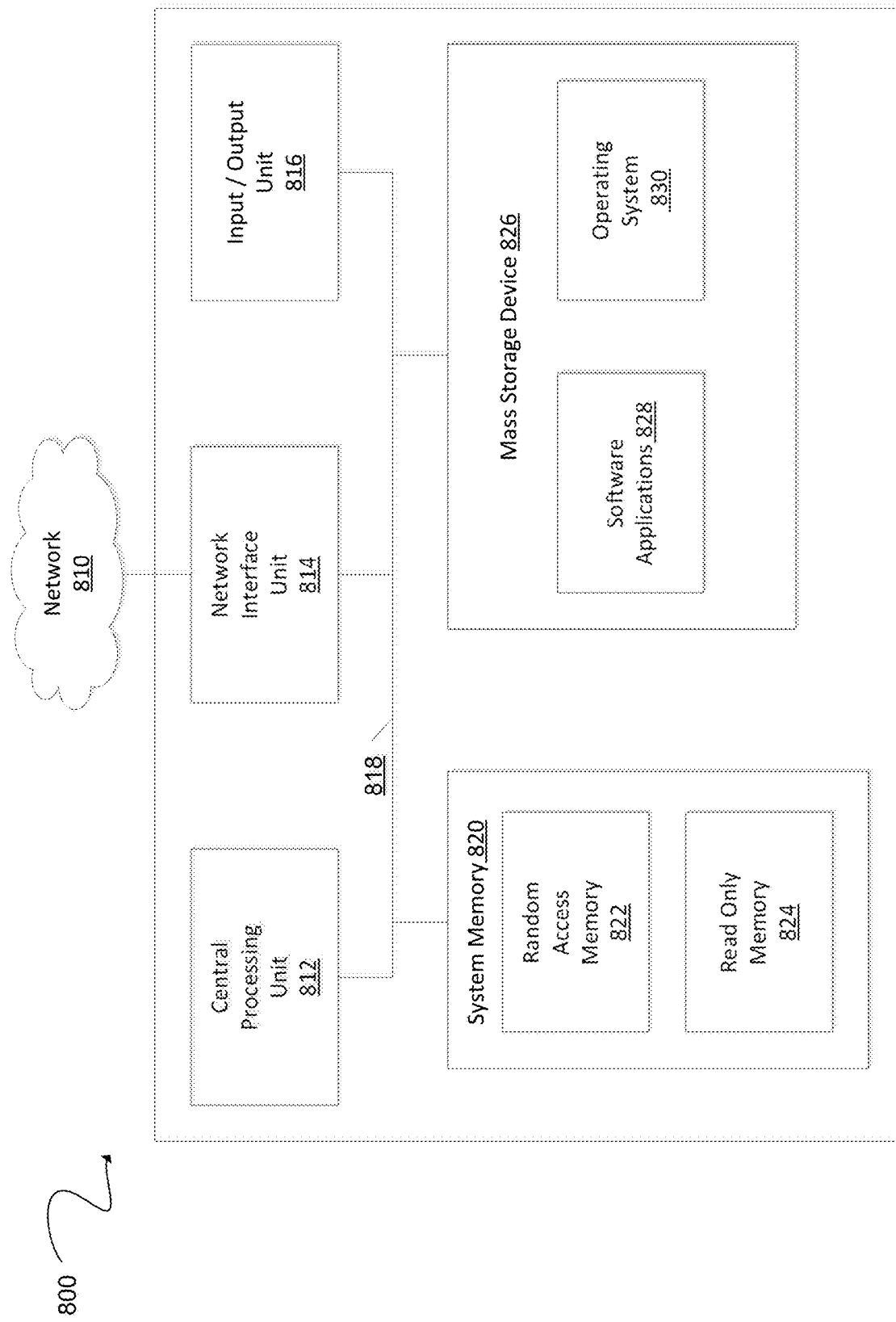
FIG. 8 is block diagram of an example computing device.

Referring now to FIG. 8, an example block diagram of a computing device 800 is shown that is useable to implement aspects of the environment 100 of FIG. 1 for creating and rendering concentric data visualization structures. In the embodiment shown, the computing device 800 includes at least one central processing unit ("CPU") 812, a system memory 820, and a system bus 818 that couples the system memory 820 to the CPU 812. The system memory 820 includes a random access memory ("RAM") 822 and a read-only memory ("ROM") 824. A basic input/output system that contains the basic routines that help to transfer information between elements within the computing device 800, such as during startup, is stored in the ROM 824. The computing device 800 further includes a mass storage device 826. The mass storage device 826 is able to store software instructions and data.

The mass storage device 826 is connected to the CPU 812 through a mass storage controller (not shown) connected to the system bus 818. The mass storage device 826 and its associated computer-readable storage media provide non-volatile, non-transitory data storage for the computing device 800. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 812 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 800.

According to various embodiments of the invention, the computing device 800 may operate in a networked environment using logical connections to remote network devices through a network 810, such as a wireless network, the Internet, or another type of network. The computing device 800 may connect to the network 110 through a network interface unit 814 connected to the system bus 818. It should be appreciated that the network interface unit 814 may also be utilized to connect to other types of networks and remote computing systems. The computing device 800 also includes an input/output unit 816 for receiving and processing input from a number of other devices, including a touch user interface display screen, or another type of input device. Similarly, the input/output unit 816 may provide output to a touch user interface display screen or other type of output device.

As mentioned briefly above, the mass storage device 826 and the RAM 822 of the computing device 800 can store software instructions and data. The software instructions include an operating system 830 suitable for controlling the operation of the computing device 800. The mass storage device 826 and/or the RAM 822 also store software instructions, that when executed by the CPU 812, cause the computing device 800 to provide the functionality discussed in this document. For example, the mass storage device 826 and/or the RAM 822 can store software instructions that, when executed by the CPU 812, cause the computing device 800 to receive and analyze data as well as create and render concentric visualization data structures.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process/method are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects are described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed:

1. A method for visualizing data:
   receiving a dataset;
   determining a plurality of data attributes that represent the dataset, wherein each of the determined data attributes are represented by a percentage value, a proportion value of a whole value or a count value;
   associating a ring-type with each determined attribute according to the value with which the determined data attribute is represented, wherein a percentage ring-type is associated with the percentage value, a proportion ring-type is associated with the proportion value of the whole value, and a count ring-type is associated with the count value,
   wherein the percentage ring-type indicates the percentage value with an exposed arc length corresponding to the percentage value,
   wherein the proportion ring-type indicates the proportion of the whole value with a wedge-shape having a size corresponding to the proportion value, and
   wherein the count ring-type indicates the count value with a segmented ring, the number of segments in the ring corresponding to the count value; and
   generating instructions for rendering a concentric visualization data structure that includes a least one percentage ring-type, at least one proportion ring-type and at least one count ring-type; and
   based on the instructions, rendering the concentric visualization data structure as an image of at least first, second and third concentric rings which correspond to the percentage ring-type, the proportion ring-type and the count ring-type, respectively, and wherein the image of each of the at least first, second and third concentric rings is independent of the image of the other two concentric rings.

2. The method of claim 1, further comprising defining display features of each of the ring types.

3. The method of claim 2, wherein the display features a display color, a display pattern, a concentric ring order, or a ring thickness.

4. The method of claim 3, wherein the concentric ring order includes the percentage ring-type as an outermost ring of the first, second and third concentric rings in the image.

5. The method of claim 4, wherein the concentric ring order includes the count-ring type as intermediate ring of the first, second and third concentric rings in the image and wherein the concentric ring order includes the proportion ring-type as the innermost of first, second and third concentric rings in the image.

6. The method of claim 1, further comprising assigning the proportion ring-type to a plurality of the determined attributes, wherein the plurality of determined attributes is combined to represent the whole.

7. The method of claim 1, wherein the rendered image includes a first plurality of concentric rings each of which corresponds to a percentage ring-type.

8. The method of claim 7, wherein the rendered image includes a second plurality of concentric rings each of which corresponds to a proportion ring-type.

9. The method of claim 8, wherein the rendered image includes a third plurality of concentric rings each of which corresponds to a count ring-type.

10. The method of claim 1, further comprising displaying hover-activatable content for each respective ring, the hover-activatable content describing the determined attribute associated with the displayed ring.

11. The method of claim 1, wherein the rendered image represents at least 20 different determined attributes.

12. The method of claim 1, wherein the rendered image represents at least 26 different determined attributes.

13. The method of claim 1, wherein the dataset includes transactional spending data corresponding to transactions between a retail guest and a retailer.

14. The method of claim 13, wherein the transactions corresponding to a physical site retailer, a web-site retailer, or a combined physical site and web-site retailer.

15. A concentric data visualization structure for displaying a plurality of attributes specific to a dataset, the concentric data visualization structure comprising:
    an image of a percentage ring indicating a percentage representative of an attribute of the dataset, wherein the percentage ring comprises an arc having an arc length corresponding to the percentage;
    an image of a proportion ring including a plurality of wedges, wherein each wedge represents a percentage proportion of a whole, wherein each proportion is representative of an attribute of the dataset, and wherein when displayed the plurality of wedges entirely fill the proportion ring; and
    an image of a count ring indicating a count value representative of an attribute of the dataset, wherein the count ring comprises a segmented circle wherein a number of the segments of the circle correspond to the count value,
    wherein the images of each of the percentage ring, the proportion ring and the count ring within the concentric data visualization structure are independent of the other two rings.

16. The concentric data visualization structure of claim 15, further comprising a plurality of percentage rings, wherein each of the plurality of percentage rings represents a different attribute of the dataset.

17. The concentric data visualization structure of claim 16, further comprising a plurality of proportion rings, wherein each of the plurality of proportion rings represents a different whole of the dataset.

18. The concentric data visualization structure of claim 17, further comprising a plurality of count rings, wherein each of the plurality of count rings represents a different attribute of the dataset.

19. The concentric data visualization structure of claim 18, wherein the plurality of percentage rings comprises the outermost rings of the data visualization structure, the plurality of count rings comprises the intermediate rings of the data visualization structure and wherein the plurality of percentage rings comprises the innermost rings of the data visualization structure.

20. A system for visualizing data of a dataset, comprising:
    a display device;
    a memory device storing executable instructions;
    a processing device in communication with the display device and the memory device, wherein the processing device executes the instructions on the memory device and is caused to:
    receive a dataset;
    determine a plurality of data attributes that represent the dataset, wherein each of the determined data attributes are represented by a percentage value, a proportion value of a whole value or a count value;
    associate a display-type with each determined attribute according to the value with which the determined data attribute is represented, wherein a percentage display-type is associated with the percentage value, a proportion display-type is associated with the proportion value of the whole value, and a count display-type is associated with the count value, wherein the percentage display-type indicates the percentage value with an exposed length of a first shape corresponding to the percentage value, wherein the proportion display-type indicates the proportion value of the whole value as a wedge-shape having a size corresponding to the proportion value, and wherein the count display-type indicates the count value with a segmented second shape, the number of segments in the segmented second shape corresponding to the count value; and generate instructions for rendering a concentric visualization data structure that includes a least one percentage display-type, at least one proportion display-type and at least one count display-type; and based on the instructions, render, on the display device, the concentric visualization data structure as an image of at least first, second and third concentric shapes which correspond to the percentage display-type, the proportion display-type and the count display-type, respectively, and wherein the image of each of the at least first, second and third concentric shapes is independent of the image of the other two concentric shapes.

* * * * *